United States Patent [19]
Watanabe

[11] Patent Number: 6,092,878
[45] Date of Patent: Jul. 25, 2000

[54] DEVICE FOR PRESUMING ACCUMULATOR PRESSURE OPERATIVE WITH PRESSURE SWITCHES

[75] Inventor: Ryochi Watanabe, Susono, Japan

[73] Assignee: Toyota Jidosha Kabushiki Kaisha, Toyota, Japan

[21] Appl. No.: 09/165,417

[22] Filed: Oct. 2, 1998

[30] Foreign Application Priority Data

Oct. 27, 1997 [JP] Japan .................................. 9-309783

[51] Int. Cl.$^7$ .................................................. B60T 13/18
[52] U.S. Cl. .......................................... 303/115.4; 303/11
[58] Field of Search .................... 303/115.4, 10, 303/11, 65, 155, 122.12, 122.13, 122.14, 3, 113.1, 116.4, DIG. 1, DIG. 2, DIG. 3, DIG. 10, DIG. 11, 122.15

[56] References Cited

U.S. PATENT DOCUMENTS

| | | |
|---|---|---|
| 3,794,845 | 2/1974 | Riddoch . |
| 4,699,435 | 10/1987 | Wupper ...................................... 303/11 |
| 4,831,532 | 5/1989 | Kondo . |
| 4,841,158 | 6/1989 | Latka ...................................... 303/11 X |
| 4,848,847 | 7/1989 | Reinartz et al. ........................... 303/11 |
| 4,900,105 | 2/1990 | Burgdorf et al. . |
| 5,631,632 | 5/1997 | Nakashima et al. . |
| 5,695,260 | 12/1997 | Tanaka et al. ...................... 303/122.12 |
| 5,961,189 | 10/1999 | Lutteke et al. .......................... 303/10 X |

FOREIGN PATENT DOCUMENTS

| | | |
|---|---|---|
| 0 599 599 A1 | 6/1994 | European Pat. Off. . |
| 8-230648 | 9/1996 | Japan . |
| 8-239648 | 9/1996 | Japan . |
| 9-123892 | 5/1997 | Japan . |

*Primary Examiner*—Matthew C. Graham
*Assistant Examiner*—Melanie Talavera
*Attorney, Agent, or Firm*—Oliff & Berridge, PLC

[57] ABSTRACT

In a device for presuming pressure of a pressure accumulator prepared for accumulating a fluid under a compression of an elastic pressurization medium to selectively supply the fluid therefrom at a raised pressure with a timely supplement of the fluid thereto by a pump, the device has a first pressure switch for detecting a first predetermined pressure level of the accumulator and a second pressure switch for detecting a second predetermined pressure level of the accumulator higher than the first pressure level, and a pressure increase gradient is calculated based upon the difference between the first and second pressure levels and the time duration lapsed for pumping up the pressure from the first pressure level to the second pressure level.

6 Claims, 6 Drawing Sheets

DEVICE FOR PRESUMING ACCUMULATOR PRESSURE OPERATIVE WITH PRESSURE SWITCHES

BACKGROUND OF THE INVENTION

1. Field of the Invention

The present invention related to a device for presuming the pressure level of a pressure accumulator prepared for accumulating a fluid under a compression of an elastic pressurization medium to selective supply the fluid therefrom with a timely supplement of the fluid thereto by pump means.

2. Description of the Prior Art

The pressure accumulators of the above-mentioned type are now popular in the art of the automatic behavior control of automobiles, serving as a source of a pressurized brake fluid for automatically actuating wheel cylinders of the automobile, so as to apply a controlled braking to each of the wheels of the automobile for various behavior controls thereof in such a manner that a front wheel at the outside of the turn is braked when the automobile is suppressed from getting into a spin, while a rear wheel or wheels, particularly a rear wheel at the inside of a turn is braked when the automobile is suppressed from getting to a driftout. In order to apply such a controlled braking to each of the wheels by an automobile behavior control device, the pressure level of the accumulator serving as the pressure source of the brake fluid is one of the essential parameters to be known.

The working pressure level of those accumulators is generally around 15 MP (mega pascal). Although various types of pressure sensors are available for use with detecting pressure of such a level, those sensors are much more expensive than the pressure switches which may only detect if a certain predetermined pressure level was traversed or not.

It is described in Japanese Patent Laid-open Publication 8-230648 to operate a pressure accumulator of a hydraulic brake circuit means of an automobile by presuming the pressure level thereof based upon a pre-estimated pressure increase gradient of the accumulator under a pumping of the brake fluid thereto by certain pump means therefor.

However, the pressure increase gradient of a combination of a certain accumulator and certain pump means will widely change according to an allowance for performances of the products, a fitting of performances according to the period of use of the products, particularly in an early stage of use, the ambient temperature according to the seasons which substantially affects the viscosity of the fluid, and so on. Therefore, it is anticipated that the pre-setting of the pressure increase gradient will not necessarily guarantee an expected control of the accumulators in the actual operation.

On the other hand, in the case of the brake fluid accumulators incorporated in the automatic brake hydraulic circuits of automobiles, it is important that the fluid pressure of the accumulator generally maintained around 15 Mp as describe above does not lower so much as to be below generally 10 Mp during the operation of the automatic brake hydraulic circuit, in order to ensure the sound operation of the automatic behavior control system of the automobile. Therefore, it is generally essential for the automatic brake hydraulic circuit that at least one pressure switch is provided for detecting that the fluid pressure of the accumulator does not lower below a limit such as 10 Mp.

Further, with respect to those automatic brake hydraulic circuits of automobiles adapted to work at such a relatively high pressure as around 15 Mp, there is a special situation that, although the pressure of the brake hydraulic circuit held in communication with the accumulator may be maintained at such a high operating pressure level during a short rest of the automobile up to a few hours often met in daily use of the automobiles, when the automobile is left in a continuous rest over a night, it is desirable that the high operating pressure in the circuit including the accumulator is releases to ensure a longer life of the brake hydraulic circuit. Therefore, indeed, such brake hydraulic circuits of automobiles are generally designed to have a leak of the brake fluid, so as to lower the pressure of the circuits to be substantially below the normal working pressure after the lapse of a certain time when the pump means are not operated in the meantime, thus requiring a substantial new charge of the accumulator when the automobile is restarted after such a continuous rest.

SUMMARY OF THE INVENTION

In view of the above, it is contemplated that, when a fluid circuit system operates with a combination of an accumulator for the fluid and pump means for charging it therein to serve as a source of the pressurized fluid, wherein the pressure of the fluid in the accumulator is to be maintained not to lower below a certain predetermined threshold level during the operation of the fluid circuit system, while the fluid of the circuit system leaks out of the circuit with a lapse of time according to a pertinent design and/or an unavoidable manufactural limit of the product, the pressure of the fluid newly charged or replenished in the accumulator can be presumed around a normal operating level by an addition of a high pressure switch for detecting the pressure of the fluid to traverse a pressure level somewhat below a desired charging or replenishing level of the accumulator pressure, by calculating a pressure increase gradient of the combination of the accumulator and the pump means between the pressure levels detectable by the low pressure and high pressure switches.

Therefore, it is a primary object of the present invention to provide an improved device for presuming the pressure level of a pressure accumulator prepared for accumulating a fluid under a compression of an elastic pressurization medium to selectively supply the fluid therefrom with a timely supplement of the fluid thereto by pump means, so that the device has a higher precision of presumption at a low cost of production.

According to the present invention, the above-mentioned primary object is accomplished by a device for presuming pressure of a pressure accumulator prepared for accumulating a fluid under a compression of an elastic pressurization medium to selectively supply the fluid therefrom with a timely supplement of the fluid thereto by pump means, the device comprising:

a first pressure switch for detecting a first predetermined pressure level of the accumulator;

a second pressure switch for detecting a second predetermined pressure level of the accumulator higher than the first pressure level;

means for counting a first time duration between a first time point at which the first pressure switch detects the first pressure level and a second time point at which the second pressure switch detects the second pressure level during a standard operation of the pump means;

means for calculating a pressure increase gradient based upon the first time duration and a difference between the first and second pressure levels;

means for counting a second time duration between the first time point and a third time point at which the standard operation of the pump means is ended; and means for calculating a pressure level of the accumulator at the third time point based upon the second time duration and the pressure increase gradient calculated by the pressure increase gradient calculation means.

It will be appreciated that by the device of the above-mentioned construction, the pressure of the fluid newly charged or subsequently replenished in the accumulator at any desired pressure level above the second pressure level set for the second pressure switch is presumed at a high accuracy and reliability, with a timely adaptation of the pressure increase gradient to the varying self and environmental operating conditions, by using the two pressure switches less expensive than a continuously operative pressure sensor.

In the above-mentioned device, the first time duration counting means may comprise:

means for cyclically watching if the first pressure switch detects an increase of the pressure of the accumulator across the first pressure level, and triggering the first time counting means to start time counting when the first pressure switch detects the increase of the pressure of the accumulator across the first pressure level; and means for cyclically watching if the second pressure switch detects an increase of the pressure of the accumulator across the second pressure level, and reading out the time count of the first time counting means when the second pressure switch detects the increases of the pressure of the accumulator across the second pressure level.

Further, the device may further comprise:

means for calculating a pressure level of the accumulator at a fourth time point based upon the pressure level at the third time point and a consumption of the fluid from the accumulator in a time duration between the third time point and the fourth time point.

With regard to the device of the above-mentioned construction, the accumulator may serve as a source means of a pressurized fluid of a brake hydraulic circuit means of an automatic behavior control system of an automobile, the brake hydraulic circuit means including a fluid reservoir, pump means for pumping the fluid from the reservoir to the accumulator, wheel cylinders, inlet control valves each controlling supply of the fluid from the pressurized source to each of the wheel cylinders, and outlet control valves each controlling exhaust of the fluid from each of the wheel cylinders toward the reservoir; the fourth time point accumulator pressure level calculation means comprising:

means for detecting fluid pressure of each of the wheel cylinders; and means for calculating a first consumption amount of the pressurized fluid based upon a time based integration of change rate of the wheel cylinder pressure of each of the wheel cylinders.

In such a construction, the hydraulic circuit means may further comprise a master cylinder for a selective depression by a driver, and a booster for a master cylinder pressure, the fourth time point accumulator pressure level calculation means further comprising:

means for detecting fluid pressure of the master cylinder; and means for calculating a second consumption amount of the pressurized fluid as an amount proportional to a time based integration of change rate of depression of the brake pedal by the drive; and means for summing the first and second consumption amounts.

In this connection, the automatic behavior control system may comprise means for starting the standard operation of the pump means when the pressure level of the accumulator calculated by the fourth time point accumulator pressure level calculation means lowers to a pressure level between the first pressure level and the second pressure level, and means for stopping the standard operation of the pump means when the pressure level of the accumulator calculated by the fourth time point accumulator pressure level calculation means rises to a pressure level above the second pressure level.

In this case, when the hydraulic circuit means are so constructed that the fluid pressure of the accumulator gradually lowers due to a leakage of the fluid so as to get lower than the first pressure level if the hydraulic circuit means are left in a rest with no replenishing operation of the pump means over a period which is generally cyclically repeated in the course of use of the hydraulic circuit means, the replenishing of the accumulator is cyclically executed to traverse the first and second pressure level at each time of replenishment, whereby the calculation of the pressure increase gradient is appropriately cyclically reviewed so as always to be adjusted to the changes of the self and environmental conditions.

BRIEF DESCRIPTION OF THE DRAWINGS

In the accompanying drawings.

DESCRIPTION OF THE EMBODIMENT

In the following, the present invention will be described in more detail with respect to an embodiment thereof with reference to the accompanying drawings.

Figure 1A:
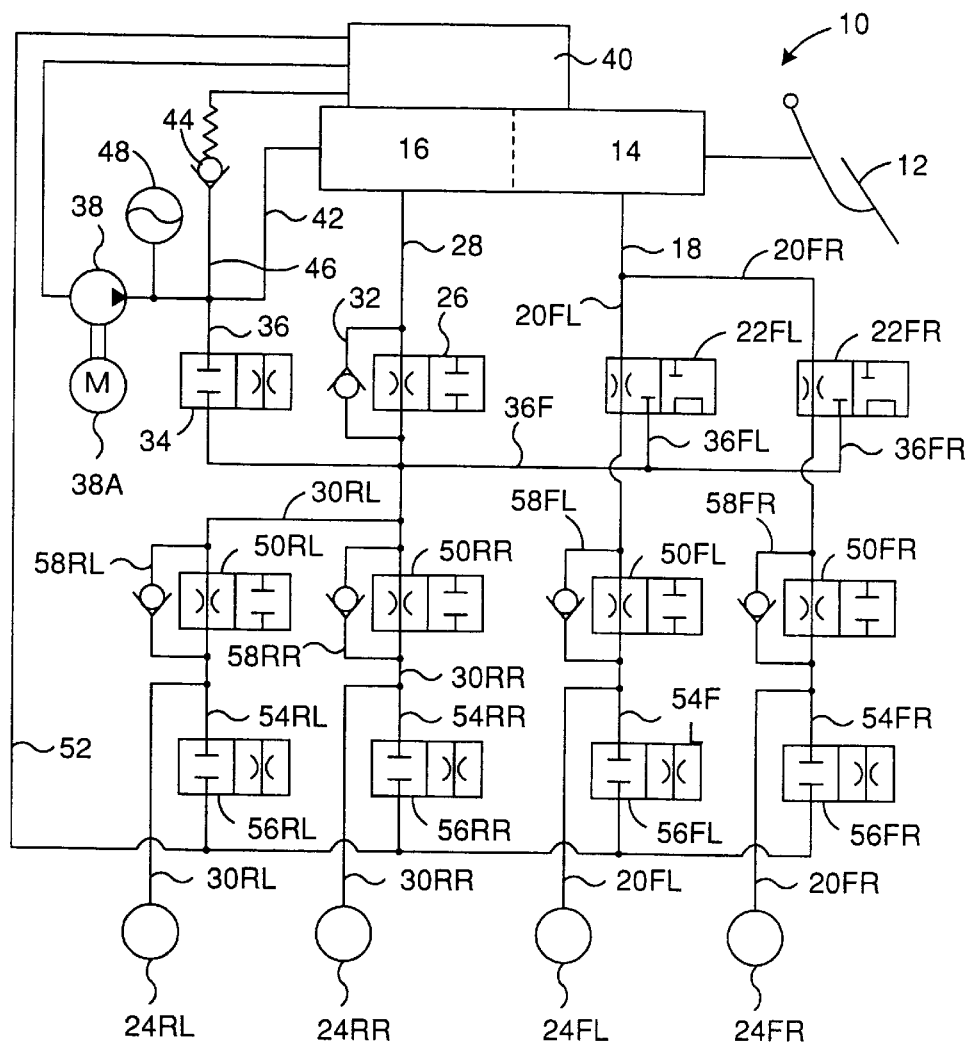
FIG. 1A is a diagrammatical illustration of an embodiment of the brake hydraulic circuit of an automatic behavior control system of an automobile, including a pressure accumulator to which the device of the present invention is applied for presuming the pressure thereof.

Referring to FIG. 1A, 10 generally designates a manual brake system including a brake pedal 12 to be depressed by a driver, a master cylinder 14 and a hydro-booster 16. A brake fluid pressurized by the mast cylinder 14 according to a depression of the brake pedal 12 is conducted through a passage 18 and branched passages 20FL and 20FR to wheel cylinders 24FL and 24FR of front left and front right wheels, respectively. The passage 20FI, incorporates change over valves 22FL and 50FL in series. The change over valve 22FL normally opens the passage 20FL through and selectively interrupts the downstream side of the passage 20FL from its upstream side connected with the master cylinder 14, while connecting the downstream side of the passage 20FL to a passage 36FL branched form a passage 36F adapted to be supplied with an accumulator pressure as described hereinbelow. The changeover valve 50FL normally opens the passage 20FL through and selectively interrupts the passage 20FL. The changeover valve 50FL is bypassed by a bypass passage 58FL including a one way valve oriented to allow the fluid to flow only from the downstream side to the upstream side thereof. Similarly, the passage 20FR incorporates changeover valves 22FR and 50FR in series. The changeover valve 22FR normally opens the passage 20FR through and selectively interrupts the downstream side of the passage 20FR from its upstream side connected with the master cylinder 14, while connecting the downstream side of the passage 20FR with a passage 36FR branched from the passage 36F. The changeover valve 50FR normally opens the passage 20FR through and selectively interrupts the passage 20FR. The changeover valve 50FR is bypassed by a bypass passage 58FR including a one way valve oriented to allow the fluid to flow only from the downstream side to the upstream side thereof.

The wheel cylinder 24FL is connected with a return passage 52 via an exhaust passage 54FL incorporating a changeover valve 56FL which normally interrupts the exhaust passage 54FL and selectively opens the exhaust passage 54F through. Similarly, the wheel cylinder 24FR is connected with the return passage 52 via an exhaust passage 54FR incorporating a changeover valve 56FR which normally interrupts the exhaust passage 54FR and selectively opens the exhaust passage 54FR through.

The brake fluid pressurized by the hydro-booster 16 is conducted through a passage 28 incorporating a changeover valve 26 to be branched to two passages 30RL and 30RR leading to wheel cylinders 24RL and 24RR, respectively. The changeover valve 26 normally opens the passage 28 through and selectively interrupts the passage 28. The changeover valve 26 is bypassed by a bypass passage 32 including a one way valve oriented to allow the fluid to flow only from the upstream side to the downstream side thereof. The passage 30RL incorporates a changeover valve 50RL which normally opens the passage 30RL through and selectively interrupts the passage 30RL. The changeover valve 50RL is bypassed by a bypass passage 58RL including a one way valve oriented to allow the fluid to flow only from the downstream side to the upstream side thereof. Similarly, the passage 30R incorporates a changeover valve 50RR which normally opens the passage 30RR through and selectively interrupts the passage 30RR. The changeover valve 50RR is bypassed by a bypass passage 58RR including a one way valve oriented to allow the fluid to flow only from the downstream side to the upstream side thereof.

The wheel cylinder 24RL is connected with the return passage 52 via an exhaust passage 54RL incorporating a changeover valve 56RL which normally interrupts the exhaust passage 54RL and selectively opens the exhaust passage 54RL through. Similarly, the wheel cylinder 24RR is connected with the return passage 52 via an exhaust passage 54RR incorporating a changeover valve 56RR which normally interrupts the exhaust passage 54RR and selectively opens the exhaust passage 54RR through.

A pump 38 is provided to be driven by an electric motor 38A for selectively pumping the brake fluid from a reservoir 40 to a supply passage 36 connected with the passage 36F via a changeover valve 34 which normally interrupts the communication between the passages 36 and 36F and selectively communications the passage 36 with the passage 36F. The output of the pump 38 is branched by a passage 42 to be supplied to the hydro-booster 16. The outlet passage 36 is also connected to the reservoir 40 by a release passage 46 including a pressure relief valve 44.

Figure 1B:
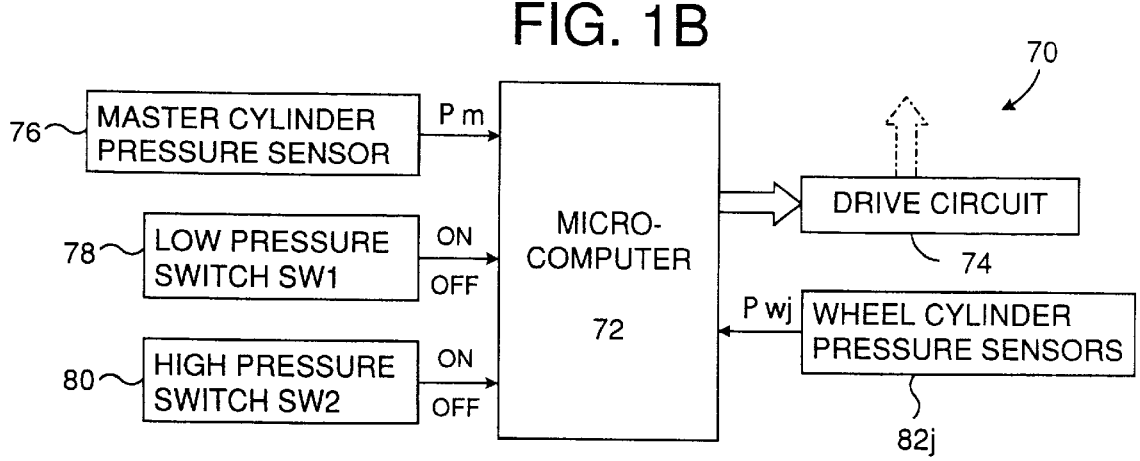
FIG. 1B is a diagrammatical illustration of a control system for the hydraulic circuit of FIG. 1A.

The changeover valves 22FL, etc. are all changed over between the two changeover positions by the respective electromagnetic actuators not shown in the figure under a control of the control system shown in FIG. 1B. The control system of FIG. 1B comprises a microcomputer 72 constructed to execute various control calculations for desired operations of the hydraulic circuit shown in FIG. 1A. The microcomputer 72 may be of a standard type including a central processing unit, a random access memory, a read only memory, input and output port means and a common bus interconnecting those components, and is supplied with input information about various parameters such as a master cylinder pressure Pm detected by a master cylinder pressure sensor 76, an on/off signal from a low pressure switch SW1 78, an on/off signal from a high pressure switch SW2 80, and wheel cylinder pressures Pwj (j=fl, fx, fl and rr) from wheel cylinder pressure sensors 82j (j=fl, fr, rl and rr).

The microcomputer 72 carries out control calculations based upon the values of those parameters and programs stored in the read only memory, and dispatches instruction signals to a drive circuit 74 which operates the changeover valves 22FL, etc. by energizing or deenergizing the electromagnetic actuators of the respective changeover valves. As well known in the art, when the automobile running along a leftward curved road is to be suppressed from spinning, the changeover valve 34 is changed over from the position shown in the figure to the position opposite thereto for communicating the passage 36 to passage 36F, while simultaneously changing over the changeover valve 22FR so that the downstream of the passage 20FR is disconnected from the passage 18 and connected to the passage 36FR, so that the fluid pressure stored in the accumulator 48 is available for operating the wheel cylinder 24FR of the front right wheel, and then the changeover valves 50FR and 56FR are selectively changed over to supply a desired amount of the pressurized fluid to the wheel cylinder 24FR, thereby selectively braking the front right wheel, so that an anti-spin moment is generated in the automobile.

On the other hand, when the automobile running along a leftward curved road is to be suppressed from drifting out, the changeover valves 34, 26, 50RL, 56RL, 50RR and 56RR are selectively changed over so that the wheel cylinder 24RL or the wheel cylinders 24RL and 24RR are supplied with a controlled fluid pressure, thereby selectively braking the rear left wheel or the rear left and rear right wheels, so that the automobile is suppressed from drifting out by the deceleration thereof, or further, a yaw moment is generated in the automobile around the braked rear left wheel so as to help the automobile to turn toward left.

Figure 2:
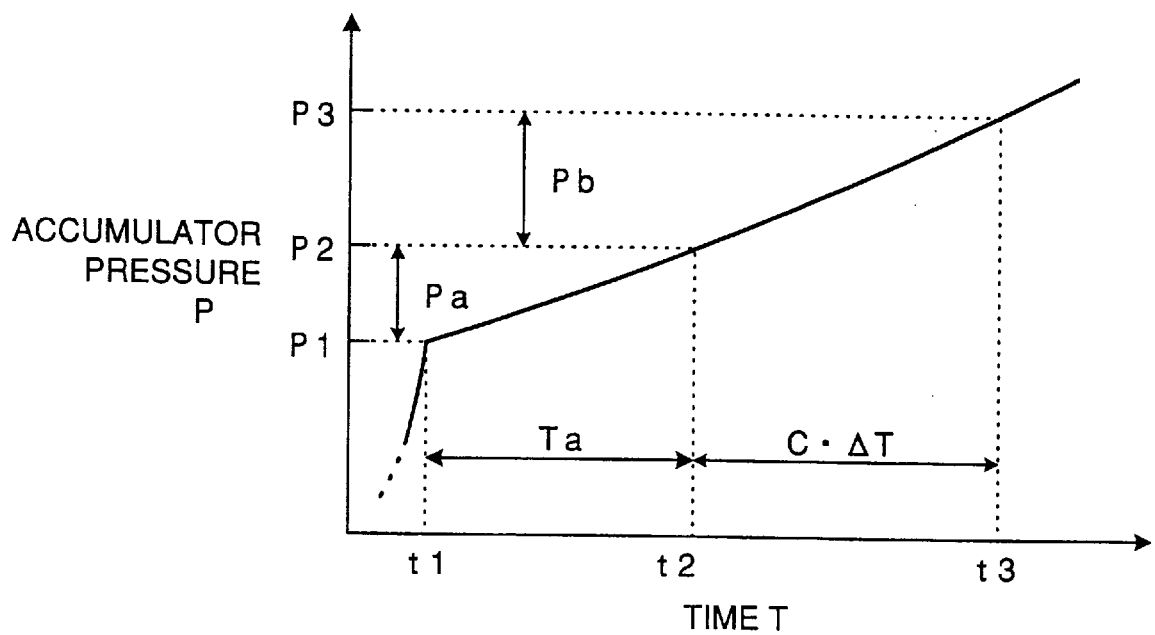
FIG. 2 is a graph showing a general performance of the pressure increase of an accumulator according to a standard charging of a fluid thereto by pump means.

FIG. 2 shows how the pressure of the accumulator 48 increases when it is charged with the brake fluid by a standard pumping operation of the pump 38 driven by the motor 38A. As diagrammatically shown in FIG. 1, the accumulator 48 is constructed to accumulate a liquid such as the brake fluid at a raised pressure under a compression of an elastic pressurization medium such as air in the shown embodiment. When the charging of the accumulator 48 is started from its substantially vacant condition, the pressure of the accumulator quickly rises after the start of the standard pumping, so that very soon at time point t1 the accumulator pressure reaches a pressure P1 at which a substantial compression of the elastic pressurization medium starts. In the case of the accumulators of the brake hydraulic circuit of automobiles as shown in FIG. 1A, the accumulator is generally designed to have the pressure level P1 at about 8 MP.

When the standard pumping continues, the accumulator pressure P rises from the pressure level P1 along a performance line slightly curved upward from a straight line as shown in FIG. 2, so that after the lapse of time Ta with an increase of pressure Pa, a pressure level P2 detectable by the low pressure switch SW1 is attained at time point t2, and further, a pressure level P3 detectable by the high pressure switch SW2 is attained at time point t3. In the case of the accumulators of the brake hydraulic circuits of the automatic behavior control of automobiles, the pressure level P2 is generally set to 10 MP which is the lowest limit of the pressure level of the pressurized fluid source for ensuring a sound operation of the automatic behavior control. In other words, the lower pressure switch SW1 is provided to watch that the accumulator pressure dose not lower below the lower limit for ensuring the sound operation of the automatic behavior control. The pressure switch like the low pressure switch SW1 for watching the lower limit of the accumulator pressure is conventional in this art.

On the other hand, the high pressure switch SW2 is set to detect a pressure such as 15 MP somewhat lower than the charging or replenishing pressure of the accumulator. In this connection, it is desirable that the capacities of the pump 38 and the motor 38A are designed to be able to accomplish such a charging or replenishing of the accumulator in several tens of seconds.

Now, an embodiment of the device for presuming the pressure of the accumulator 48 will be described in the form of the operations thereof by referring to FIGS. 3–6.

Figure 3:
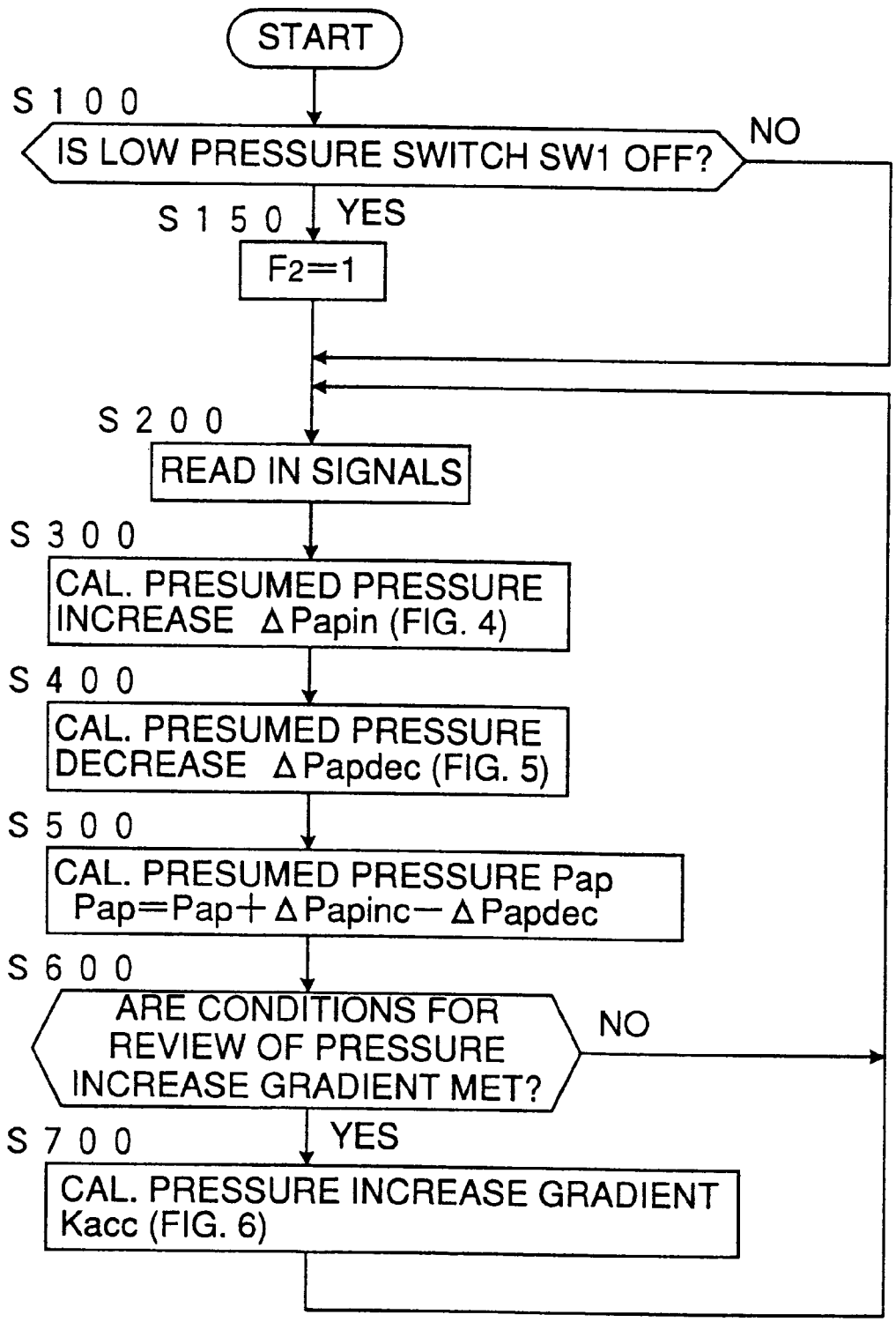
FIG. 3 is a flowchart showing an embodiment of the device of the present invention in the form of the operations thereof.

FIG. 3 is a flowchart of a main routine showing the overall operations executed by the embodiment of the present invention. As well known in the art, the control operations according to such a main routine are started by a closure of an ignition switch not shown in the figure of the automobile, and are cyclically repeated until the ignition switch is turned off.

Figure 6:
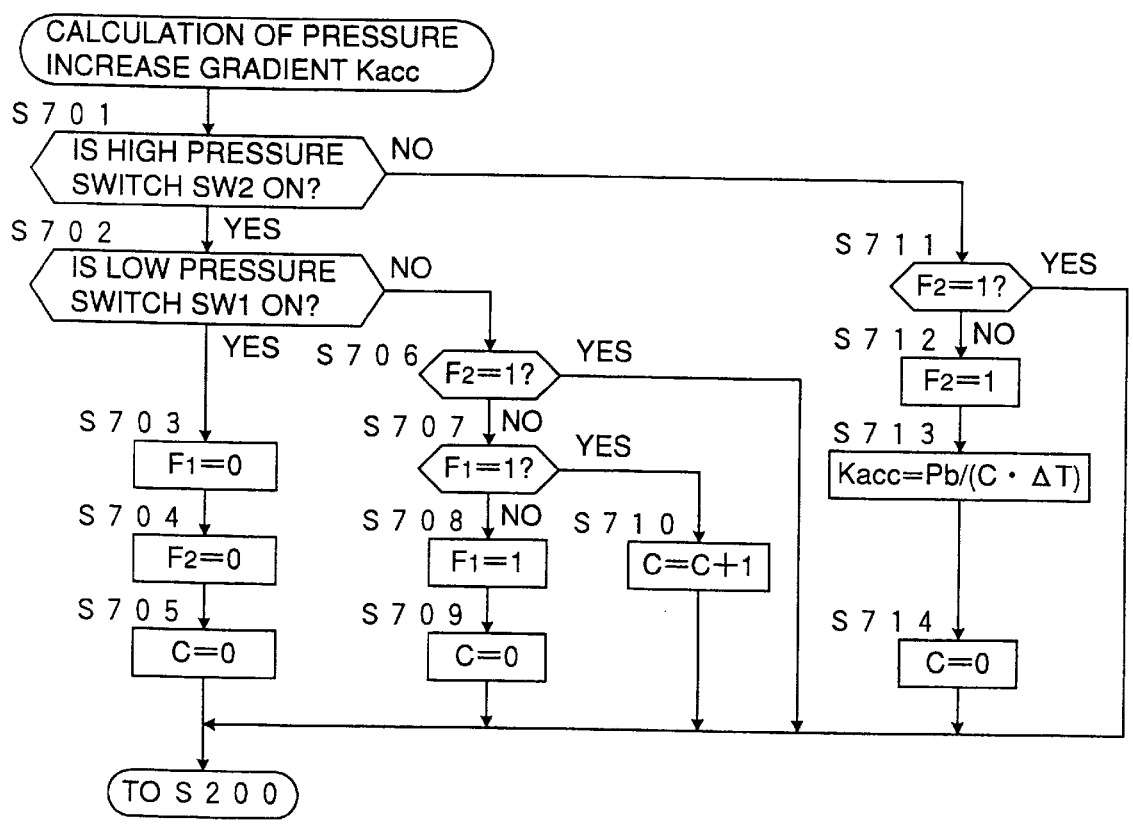
FIG. 6 is a flowchart showing a subroutine executed in step 700 of FIG. 3.

In step 100, it is judged if the lower pressure switch SW1 is off. In the present embodiment, the low pressure switch SW1 becomes an "on" state when the pressure of the accumulator is lower than the pressure P2 like 10 MP, while it becomes an "off" state when the pressure of the accumulator is equal to or higher than the pressure P2, although there is a certain hysteresis in its actual switching-over operation. When the answer of the judgment is yes, it indicates that the pressure of the accumulator is higher than the pressure P2, i.e. the lower limit thereof to be maintained for the sound operation of the automatic behavior control. In this case, the control proceeds to step 150, and a flag F2, the function of which will be appreciated later with reference to FIG. 6, is set to 1, and then the control proceeds to step 200. When the answer of the judgment is no, the control directly proceeds to step 200.

In step 200, signals such as those shown in FIG. 1B are read in.

Figure 4:
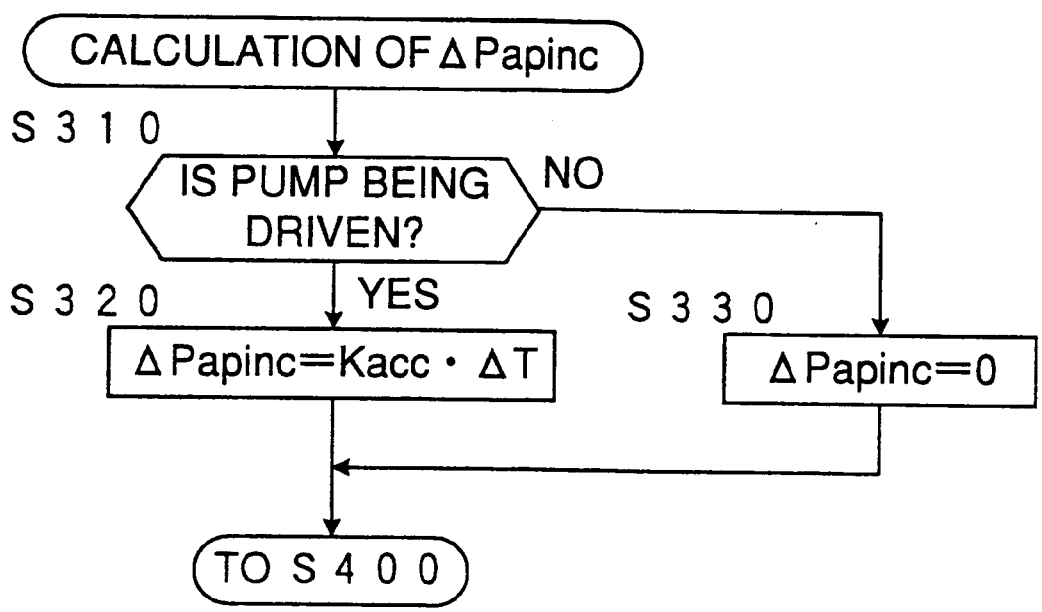
FIG. 4 is a flowchart showing a subroutine executed in step 300 of FIG. 3.

In step 300, a presumed pressure increase ΔPapin, i.e. a pressure increase in one small cycle period based upon the pressure increase gradient calculated as described in detail later is calculated as shown in the subroutine of FIG. 4, as described in detail later.

In step 400, a presumed pressure decrease ΔPapdec, i.e. a pressure decrease in the small one cycle period due to a consumption of the pressurized fluid, is calculated according to a subroutine shown in FIG. 5, as described in detail later.

In step 500, a presumed pressure Pap at the current time point is calculated by modifying the value of Pap calculated at a previous cycle through this flowchart by adding the above calculated ΔPapinc and by deducing the above calculated ΔPapdec.

In step 600, it is judged if certain conditions for review of the pressure increase gradient are met. The certain conditions may be such that the pump 38 is being driven at a standard rate, change rate of the master cylinder pressure Pm is 0 or negative, and none of the wheels are being braked, i.e. all of the wheel cylinders 24FL–24RR are exhausted. When the answer of the judgment is no, the control returns to step 200, while when the answer is yes, the control proceeds to step 700.

In step 700, the pressure increase gradient is calculated according to the subroutine shown in FIG. 6 as described in detail later. This calculation is to presume the pressure increase gradient of the rise of the accumulator pressure according to the standard operation of the pump 38, i.e. a mean gradient of the curve of FIG. 2 between a point (t2, P2) and a point (t3, P3).

Referring to FIG. 4, the calculations of step 300 of FIG. 3 will be described in more detail.

In step 310, it is judged if the pump 38 is being driven at the standard rate. When the answer of the judgment is yes, the control proceeds to step 320, and the presumed pressure increase ΔPapinc is calculated as a product of Kacc and ΔT, wherein Kacc is the pressure increase gradient calculated in a previous cycle passed through step 713 of FIG. 6 described in detail later or a provisional value predetermined for the first cycle of calculation through step 320.

When the answer of the judgment of step 310 is no, the control proceeds to step 330, and the presumed pressure increase ΔPapinc within the cycle period is made 0.

After step 320 or 330, the control proceeds to step 400.

Figure 5:
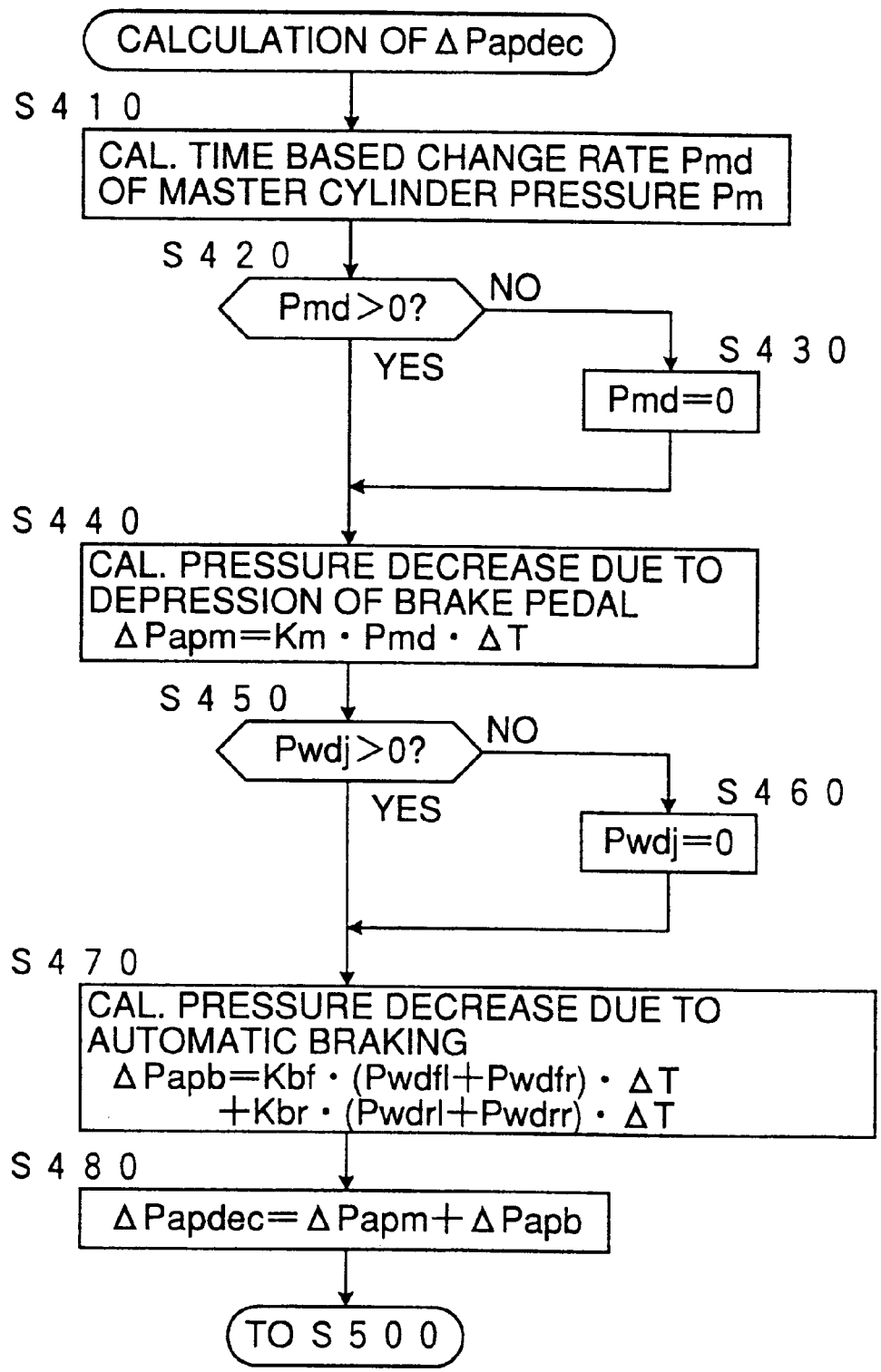
FIG. 5 is a flowchart showing a subroutine executed in step 400 of FIG. 3.

Referring to FIG. 5, the calculations carried out in step 400 will be described in more detail.

In step 410, a time based change rate Pmd of the master cylinder pressure Pm is calculated.

In step 420, it is judged if Pmd is positive. It is only when the master cylinder is compressed that a consumption of the pressurized fluid occurs, as described hereinbelow. If the answer of the judgment is yes, the control proceeds to step 440, while if the answer of the judgment is no, the control proceeds to step 430, where Pmd is made 0, and the control proceeds to step 440.

In step 440, a pressure decrease ΔPapm due to a depression of the brake pedal 12 is calculated as a product of Pmd and the cycle time ΔT, multiplied by an appropriate proportioning factor Km. Such a pressure decrease due to a depression of the brake pedal is caused by a corresponding amount of the pressurized fluid being consumed by the hydro-booster 16 in proportion to the depression of the brake pedal.

In step 450, it is judged if time based change rates Pwdj (j=fl, fr, rl and rr) of the wheel cylinder pressures Pwj (j=fl, fr, rl and rr) are each positive. It is also only when the wheel cylinder pressures are increased that a corresponding consumption of the pressurized fluid occurs.

When the answer of the judgment is yes, the control directly proceeds to step 470, while when the answer is no, the control proceeds to step 460, where any of Pwdj which is negative is set to zero.

In step 470, a pressure decrease ΔPapb due to an automatic braking is calculated as follows:

$$\Delta Papb = Kbf \cdot (Pwdfl + Pwdfr) \cdot \Delta T$$

$+Kbr \cdot (Pwdrl+Pwdrr) \cdot \Delta T$

In the above equation, Pwdfl, Pwsfr, Pwdrl and Pwdrr are the change rates Pwdj (j=fl, fr, rl and rr) of the wheel cylinder pressures Pwfl, Pwfr, Pwrl and Pwrr detected by the wheel cylinder pressure sensors 82j (j=fl, fr, rl and rr), respectively. ΔT is the cycle time, Kbf is an appropriate proportioning factor with respect to the braking of the front wheels, and Kbr is a similar proportioning factor for the braking of the rear wheels.

In step 460, the presumed pressure decrease ΔPapdec is calculated as a sum of ΔPapm and ΔPapb.

Then the control proceeds to step 500.

Referring to FIG. 6, the calculation of the pressure increase gradient Kacc will be described in more detail.

In step 701, it is judged if the high pressure SW2 is on. If the answer is yes, it indicates that the pressure of the accumulator is below the pressure level P3.

In step 702, it is judged of the low pressure switch SW1 is on. When the answer is yes, it indicates that the pressure of accumulator is below the pressure level P2. In this case, the control proceeds downward through steps 703–705.

In step 703, a flag F1 is set to 0. In step 704, the aforementioned flag F2 is set to 0. In step 705, count number C of a counter is reset to 0. Then the control proceeds to step 200. In this case, the condition of the accumulator is ready for a substantially new charging or a replenish charging. As described in the introductory portion of the present specification, the hydraulic circuit shown in FIG. 1A is constructed to cause a gradual leakage of the pressurized fluid in the passages or the changeover valves connected to the outlet passage 36 of the pump 38 to which the accumulator 48 is connected when the hydraulic circuit is left with the pump 38 at rest over a time such as a few hours. Therefore, the above-mentioned starting condition of the accumulator with the low pressure switch SW1 being on is a condition that the hydraulic circuit was left at rest so long that the pressure of the accumulator lowered below the pressure level P2, although it is not known by the switching condition of the low pressure SW1 whether the accumulator pressure has lowered so far as to be below the pressure level P1.

In any event, starting from such a condition, when the pump 38 is put into operation under the control of the microcomputer 72, the pressure of the accumulator rises along the performance curve shown in FIG. 2, so that at time point t2 the pressure of the accumulator reaches the pressure level P2, thereby turning off the low pressure SW1. When the answer of step 702 turns to no, then the control is diverted to step 706, and it is judged if the flag F2 is 1. In such a first pass, the answer is no, and therefore the control proceeds to step 707, and it is judged of the flag F1 is 1. In such a first pass, the answer is no, and the control proceeds to step 708, where the flag F is set to 1, and then the control proceeds to step 709, and the count number C of the counter is also reset to 0.

In the next cycle through steps 701 to 707, the control is now diverted to step 710, and the count number C is incremented by 1. Thus, it is started to count the time of charging the accumulator starting from the time point t2.

When the pressure of the accumulator reaches the pressure level P3, the high pressure switch SW2 is turned off. Then the control is diverted from step 701 to step 711, and it is judged if the flag F2 is 1. In the first pass, the answer is no, and therefore the control proceeds to step 712, where the flag F2 is set to 1. Then the control proceeds to step 713, and the pressure increase gradient Kacc is renewed by a value which is the pressure difference Pp between the pressure levels P3 and P2 divided by the time duration C·ΔT lapsed from the time point t2 to a time point t3 at which the high pressure switch SW2 was turned off. Then the control proceeds to step 714, and the count number C is reset to 0. The pump 38 may be operated for further several seconds so that the pressure of the accumulator increases up to a final pressure such as 17 MP. Then the pump 38 is stopped under the control of the microcomputer 72.

Thereafter, for the time being until the pressure of the accumulator decreases according to a consumption of the pressurized fluid below the pressure level P3, the control proceeds through steps 701 and 711 directly to step 200.

When the accumulator pressure decrease further to become the pressure level P3, the high pressure switch SW2 is turned on, and thereafter the control proceeds through steps 701, 702 and 706 directly to step 200.

When the accumulator pressure further decreases to become lower than the pressure level P2, the lower pressure switch SW1 is turned on, and thereafter the control proceeds through steps 701 to 705 straight downward in the flowchart of FIG. 6. When the lower pressure switch SW1 was turned on, the pump 38 is started to replenish the accumulator 48.

Although the present invention has been described in detail with respect to a preferred embodiment thereof, it will be apparent for those skilled in the art that various modifications are possible with respect to the shown embodiment within the scope of the present invention.

What is claimed is:

1. A device for presuming pressure of a pressure accumulator prepared for accumulating a fluid under a compression of an elastic pressurization medium to selectively supply the fluid therefrom with a timely supplement of the fluid thereto by pump means, the device comprising:

a first pressure switch for detecting a first predetermined pressure level of the accumulator;

a second pressure switch for detecting a second predetermined pressure level of the accumulator higher than the first pressure level;

means for counting a first time duration between a first time point at which the first pressure switch detects the first pressure level and a second time point at which the second pressure switch detects the second pressure level during a standard operation of the pump means;

means for calculating a pressure increase gradient based upon the first time duration and a difference between the first and second pressure levels;

means for counting a second time duration between the first time point and a third time point at which the standard operation of the pump means is ended; and means for calculating a pressure level of the accumulator at the third time point based upon the second time duration and the pressure increase gradient calculated by the pressure increase gradient calculation means.

2. A device according to claim 1, wherein the first time duration counting means comprises:

means for cyclically watching if the first pressure switch detects an increase of the pressure of the accumulator across the first pressure level, and triggering the first time counting means to start time counting when the first pressure switch detects the increase of the pressure of the accumulator across the first pressure level; and means for cyclically watching if the second pressure switch detects an increase of the pressure of the accumulator across the second pressure level, and reading out the time count of the first time counting means when the second pressure switch detects the increase of the pressure of the accumulator across the second pressure level.

3. A device according to claim 1, further comprising:

means for calculating a pressure level of the accumulator at a fourth time point based upon the pressure level at the third time point and a consumption of the fluid from the accumulator in a time duration between the third time point and the fourth time point.

4. A device according to claim 3, wherein the accumulator serves as a source means of a pressurized fluid of a brake hydraulic circuit means of an automatic behavior control system of an automobile, the brake hydraulic circuit means including a fluid reservoir, pump means for pumping the fluid from the reservoir to the accumulator, wheel cylinders, inlet control valves each controlling supply of the fluid from the pressurized source to each of the wheel cylinders, and outlet control valves each controlling exhaust of the fluid from each of the wheel cylinders toward the reservoir; the fourth time point accumulator pressure level calculation means comprising:

means for detecting fluid pressure of each of the wheel cylinders; and means for calculating a first consumption amount of the pressurized fluid based upon a time based integration of change rate of the wheel cylinder pressure of each of the wheel cylinders.

5. A device according to claim 4, wherein the hydraulic circuit means further comprises a master cylinder for a selective depression by a driver, and a booster for a master cylinder pressure, the fourth time point accumulator pressure level calculation means further comprising:

means for detecting fluid pressure of the master cylinder;

means for calculating a second consumption amount of the pressurized fluid as an amount proportional to a time based integration of change rate of depression of the brake pedal by the drive; and means for summing the first and second consumption amounts.

6. A device according to claim 5, wherein the automatic behavior control system comprises means for starting the standard operation of the pump means when the pressure level of the accumulator calculated by the fourth time point accumulator pressure level calculation means lowers to a pressure level between the first pressure level and the second pressure level, and means for stopping the standard operation of the pump means when the pressure level of the accumulator calculated by the fourth time point accumulator pressure level calculation means rises to a pressure level above the second pressure level.

* * * * *